June 26, 1934.   G. D. ROEDELS   1,964,215
ADMISSION TICKET CHECKING SYSTEM
Filed Jan. 30, 1933   3 Sheets-Sheet 1
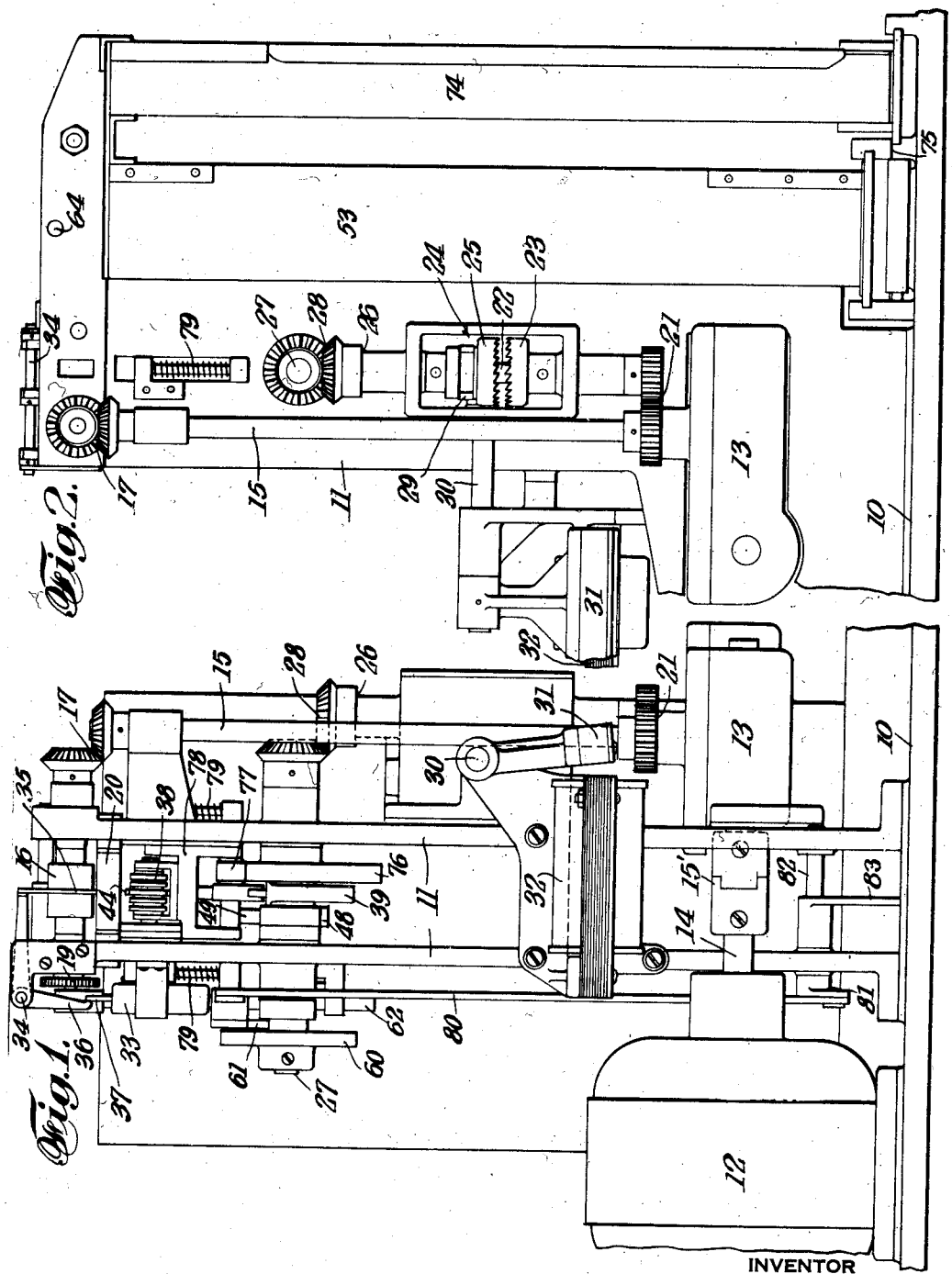
INVENTOR
GEORGE D. ROEDELS
BY
ATTORNEY June 26, 1934.   G. D. ROEDELS   1,964,215
ADMISSION TICKET CHECKING SYSTEM
Filed Jan. 30, 1933   3 Sheets-Sheet 3
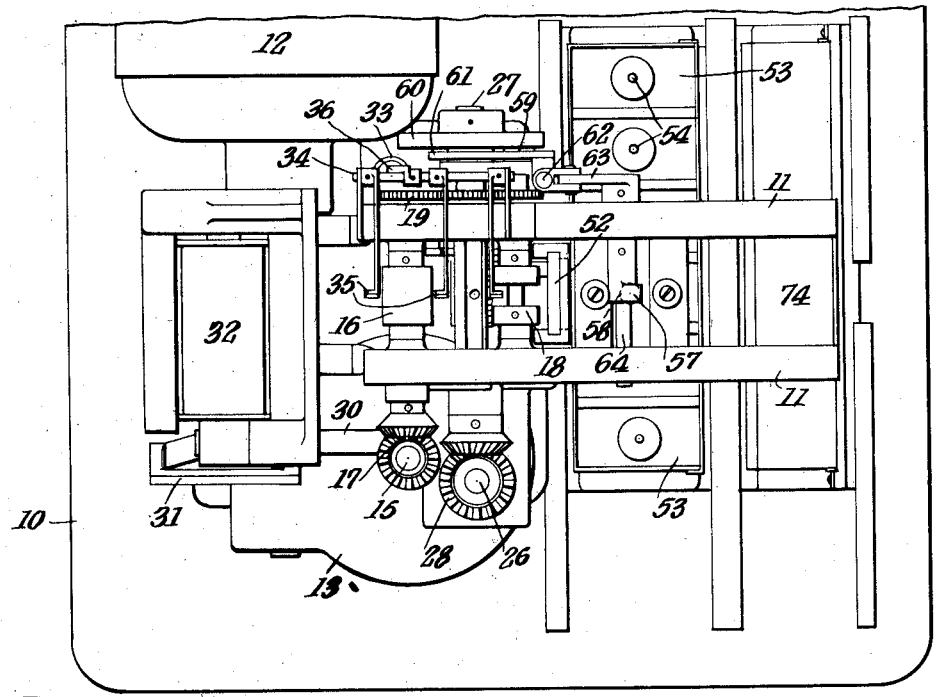
Fig.4.
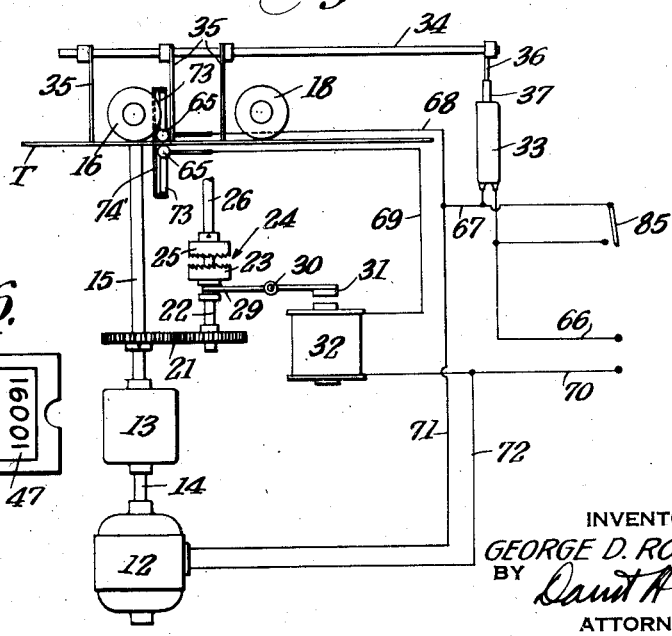
Fig.5.
Fig.6.
INVENTOR
GEORGE D. ROEDELS
BY David Heller
ATTORNEY Patented June 26, 1934

1,964,215

UNITED STATES PATENT OFFICE 1,964,215

ADMISSION TICKET CHECKING SYSTEM

George D. Roedels, Greenwich, Conn.

Application January 30, 1933, Serial No. 654,301

8 Claims. (Cl. 101—66)

This invention relates to admission ticket checking systems and more particularly to a device adapted for use in a system to check strip tickets of uniform value.

It is the practice today in motion picture theatres for instance for the patron to buy from the ticket seller one or more admission tickets, depending on his needs. These are usually supplied to the patron in a continuous strip from a suitable machine. He then tenders this strip of one or more tickets to a door man or ticket taker who severs each ticket in two, giving the patron one half and depositing the other half through a slot into a receptacle which is later emptied by the theatre management, the halves of tickets being counted and comparisons made with the ticket seller's record of tickets sold as determined by the cash taken in and the serial numbers on the unsold tickets.

It is known that theatres suffer a considerable loss each day in not receiving the full amount of the paid admissions and that such losses are due to collusion between the ticket seller and ticket taker. Various methods of theft have been detected but the management is powerless to make direct accusations without absolute proof.

One well known method for accomplishing such theft entails palming the ticket half destined for the ticket receptacle and giving this half to the next patron. The ticket taker then having an unmultilated ticket, he may in some manner place it into the hands of the ticket seller, who then resells the ticket and pockets the price thereof.

It is commonly acknowledged that the loss of revenue to the theatre is considerable and it is therefore a major object of the invention to provide a system for minimizing such loss, said system including a machine to replace the ticket receptacle above mentioned, and into which a single ticket or several in a strip, may be fed and having the machine imprint upon each ticket a number which may later be checked against the serial number already on the ticket.

As an example—during a certain period of the day, the serial numbers of the tickets sold are between "16000" and "16100". When the ticket bearing the serial number "16000" is handed to the ticket taker he places it into the machine where it is imprinted with another number such as "400". The next ticket sold will have the serial number "16001" and when this ticket is placed into the checking machine it will be imprinted with the next number "401" and so forth. Now it is true that the tickets do not get to the ticket taker in exactly the same order as they are sold, but nevertheless, they usually arrive there within a minute or two of the time they are sold and therefore the differential between the serial number and checking number should aproximate in this example "15600". Should this differential vary any considerable amount, it will at once be apparent that the ticket did not have the usual short course between the seller and taker. For instance—when the the ticket "16000"' was handed to the ticket taker, he in some manner avoided placing it in the machine and then a half hour or hour later got it into the hands of the seller, who resold it. When this ticket is eventually placed into the checking machine it may be imprinted with a checking number such as "560".

When at a subsequent time the tickets are removed from the machine and the serial numbers checked against the checking numbers this differential between "16000" and "560" or "15440" when compared with the normal differential of "15600" will indicate that this ticket has in some manner been delayed in reaching the ticket taker. The theatre management may then form their own conclusions as to the reason for this delay.

Where a theatre sells tickets of various prices, one canceling machine may be employed for all such tickets. In this event however it is desirable to give to the patron a coupon indicative of the price of the seat his ticket called for, this coupon then being handed to an usher within the theatre. Another important object of the invention, therefore, is to provide a ticket checking system and a machine into which one or more tickets in a strip may be fed and stored, a checking number imprinted on each and a seating coupon dispensed therefrom, for each ticket so inserted.

Another object is to provide a ticket checking and coupon dispensing machine, operated by an electric motor, the circuit of which is closed when a ticket is inserted into the machine and in which a solenoid, controlling an operating cam shaft, is energized when the ticket is so inserted.

A further object is in the provision of such a machine employing a vacuum type switch controlling an operating motor and which is closed when a ticket is inserted into the machine, the switch being held closed by the ticket during its path through the machine.

A still further object is to provide a machine of this class employing a ticket magazine provided with a vertical rod upon which the tickets may be strung to prevent unauthorized removal, said tickets being perforated by the machine to facilitate this and severed from each other to permit stacking in the magazine.

A still further object is to provide a machine of this class having means to sever a strip into individual centrally perforated tickets which are then strung on a pin in the magazine.

A yet further object is in the provision of a machine of this class employing a plurality of magazines for the incoming tickets and outgoing coupons each of which when they are filled or emptied as the case may be are shifted out of the ticket path, another empty ticket magazine replacing the full one and another full coupon dispensing magazine replacing the empty one.

Further objects and advantages of the invention will appear from the following disclosure thereof together with the attached drawings which illustrate a preferred form of embodiment thereof, and in which:

Fig. 1 illustrates a front elevational view of a machine constructed in accordance with the invention.

Fig. 2 is a side elevational view thereof.

Fig. 4 is a plan view of the machine to the same scale as Figs. 1 and 2.

Fig. 5 is a diagrammatic view of some of the operating parts incorporating a wiring diagram, and Fig. 6 is a view of one of the tickets displaying the serial number, the checking number and the central perforation.

Figure 3:
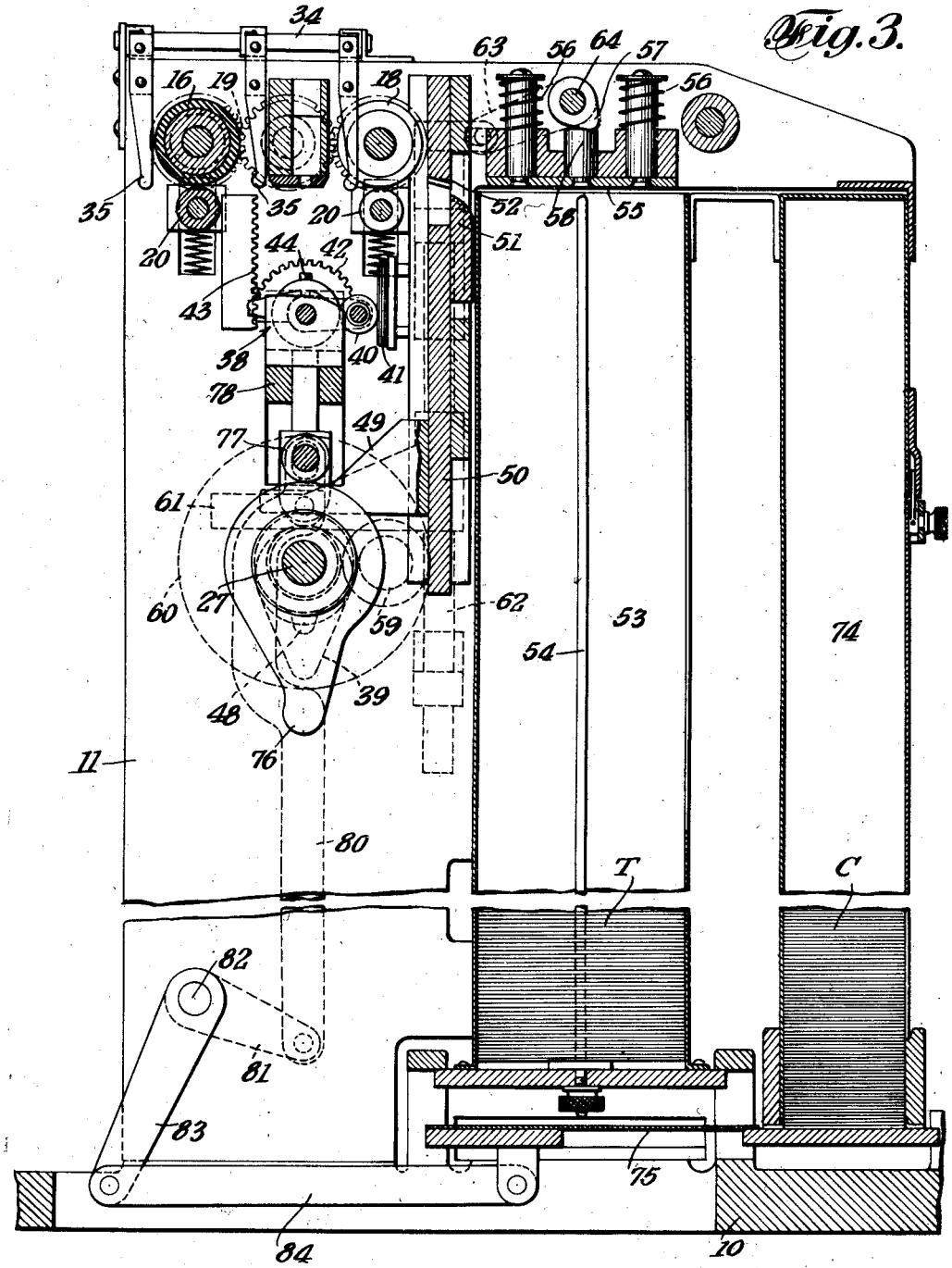
Fig. 3 is a vertical sectional view through the ticket path drawn to an enlarged scale with certain portions broken away.

Referring to the drawings in greater detail, the numeral 10 designates generally a support base upon which may be secured the upright frame members 11. Supported on the base 10 there is shown at 12, a usual type of electric motor connected to reduction gearing within the casing 13 by a shaft 14 and flexible coupling 15'.

A vertical shaft 15 protrudes from the reduction gearing casing and this shaft extends upwardly to drive a ticket feed roll 16 through gearing 17. Another feed roll 18 is driven by the feed roll 16 by means of suitable gears 19 and each of these rolls are contacted from beneath by pressure rollers 20.

The vertical shaft 15 is also provided at its lower portion with a gearing drive 21 to the shaft 22. This shaft is provided with one portion 23 of a clutch 24, the other clutch portion 25 being slidably keyed to a shaft 26 which is adapted to drive a cam shaft 27 through gearing 28.

The clutch member 25 is shifted into engagement with the portion 23 by means of a fork 29 affixed to a shaft 30 carrying the armature 31 of an electric magnet or solenoid 32.

The cam shaft 27 is operable only when energizing of the solenoid causes engagement of the clutch portions 23—25 and the machine goes through its cycle of operation only when this occurs. This is accomplished when the vacuum switch 33 of any usual form is closed. To this end there is provided a rock shaft 34 having thereon a number of suitably spaced ticket engaging fingers 35 and an arm 36 adapted to move the switch operating stem 37. As most clearly seen from Fig. 1, when a ticket is presented between the feed rolls 16 and 20 the first of the ticket engaging members 35 will be lifted to cause slight rocking of the shaft 34 and pressure of the arm against the switch stem 37. As the ticket progresses to the right, Fig. 3, each of the other fingers 35 will be retained in a raised position until the trailing end of the ticket passes by, when they will drop by gravity to release the pressure upon the switch stem which opens the switch.

As the ticket or tickets "T" pass through the machine a printing mechanism 38 of suitable structure and progressively advanced numerically with each cycle of the cam shaft, is raised and lowered for each ticket length, by a cam 39. The printing mechanism is provided with a suitable inking roller 40 which transfers ink from the pad 41 to the face of the printing type and this inking roller is brought across the face of the type by means of the sector 42 having engagement with the stationary rack 43 when the mechanism starts upward.

Interposed between the type wheels of the printing unit there is provided a ticket perforating pin 44 to produce the perforation 45 in the ticket. A checking number such as 46 is imprinted on the ticket in this manner and this number is used for comparison with the serial number such as 47 already on the ticket.

Another cam 48 on the cam shaft engages a shoe 49 affixed to a knife slide 50 bearing the knife 51 movable across the ticket path. The knife 50 co-acts with the shear plate 52 to sever between two attached strip tickets at the proper time.

At 53 there is illustrated a ticket receiving magazine composed in this instance of a plurality of ticket receiving compartments. The magazine, as a whole, is manually or otherwise shiftable so that when one magazine compartment is filled another empty compartment may readily replace it. Each of the magazine compartments is provided with an upstanding stringing rod 54 which may be removed only when the magazine is removed from the machine.

To facilitate the dropping of the perforated and imprinted tickets into the magazine compartment, there is shown at 55 a push plate normally held elevated by the springs 56 but serving to push a ticket downward into the magazine when the cam lug 57 depresses the stud 58 affixed to the push plate. The cam lug is operated by means of the roller 59 on the plate 60 raising and lowering the shoe 61 and the slide rod 62 to which it is attached. The upper end of the slide rod 62 has a pin and slot connection with an arm 63 fixed to the shaft 64 carrying the cam lug 57.

Referring to Fig. 5, there is shown a pair of members in the form of non-conducting rollers 65 between which the ticket passes. Normally these rollers are in contact with each other and there is no circuit through the solenoid, since the metal contacts 73 carried by each of the rollers is out of contact with the bridging member 74'. They should be preferably placed slightly beyond the first feed rolls as will hereafter be described.

In operating, when a strip of for instance three tickets is fed to the machine, the leading edge of the first ticket will raise the first of the fingers 35 causing the closing of the vacuum switch 33. The electric circuit will then be as follows—from the line wire 66 to the switch 33, conductors 67, 71, motor 12, conductor 72 and line wire 70. The feed rolls 16 and 18 will now operate to feed the strip through the machine. As the leading edge of the strip spreads the rolls 65 the following circuit is made—line wire 66, switch 33, conductors 67, 68, first contact 73, bridge 74', second contact 73, conductor 69, solenoid 32 and line wire 70. The cam shaft is now in operation and will continue to be so until the trailing edge of the strip passes between the rollers 65. At the proper place each ticket receives the imprint of the checking member and the central perforation and similarly each ticket is severed from the adjacent one and drops into the magazine. When the trailing edge of the strip passes beyond the last finger 35, the machine comes to rest, the last ticket having enough momentum to find its way into the magazine.

The foregoing is descriptive of a checking machine into which one or more strip tickets may be fed to receive its checking member and a machine constructed in accordance will be complete in itself. It may be desirable however to supply to the theatre patron seating coupons, one for each ticket paid for. To this end the machine may be provided with another magazine 74, also compartmented, into which are placed seating coupons such as "C". The bottom of the magazine is open and an ejector 75 is used to eject one coupon for each revolution of the cam shaft.

A cam 76 engages a roller 77 on the cross slide 78 which is normally urged downwardly by the springs 79. A link 80 is connected at one end to the cross slide and at the other to an arm 81 fixed to the rockshaft 82. Another arm 83 fixed to the rockshaft is pivotally connected to a link 84 having connections with the ejector 75. It is apparent that each revolution of the cam shaft will reciprocate the ejector to eject one coupon.

It may be desirable at times to have the motor operate continuously and for this purpose a switch 85 may be provided to short circuit the switch 33. The feed rolls will then be in continuous rotation thereby increasing the capacity of the machine. The cam shaft, of course, will operate only when a strip is feeding through the machine.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:

1. A strip ticket checking machine comprising means to imprint on the face of each ticket comprising the strip, a number comparable to its serial number, means to stack the tickets so imprinted, a supply of coupons and means to eject one of said coupons for each ticket so stacked.

2. A strip ticket checking machine comprising means to imprint on the face of each ticket comprising the strip, a number comparable to its serial number, means to sever the strip into individual tickets and means to stack the tickets so imprinted and severed, a supply of coupons and means to eject one of said coupons for each ticket so stacked.

3. A strip ticket checking machine comprising means to imprint on the face of each ticket comprising the strip, a number comparable to its serial number, means to sever the strip into individual tickets, means to perforate each ticket, a ticket receiving magazine and an upstanding rod to receive the perforated tickets to prevent their unauthorized removal from the magazine, a supply of coupons and means to eject one of said coupons for each ticket received by the magazine.

4. In a strip ticket checking machine, means to feed the strip through the machine comprising feed rolls, an electric motor to drive the feed rolls, an electric switch, said switch closing the motor circuit when a strip is passing through the feed rolls, means to print a number on the face of the ticket and to simultaneously perforate said ticket, cam means to operate the mentioned printing and perforating means, means to sever the strip into individual tickets, cam means to operate the ticket severing means, and means to render operative all of the mentioned cam means.

5. In a strip ticket checking machine, means to feed the strip through the machine comprising feed rolls, an electric motor to drive the feed rolls, an electric switch, said switch closing the motor circuit when a strip is passing through the feed rolls, means to print a number on the face of the ticket and simultaneously perforate said ticket, cam means to operate the mentioned printing and perforating means, means to sever the strip into individual tickets, cam means to operate the ticket severing means, means to render operative all of the mentioned cam means, said latter means comprising a strip operated switch, a solenoid energizable thereby and clutch means operated by the solenoid whereby the motor will drive the mentioned cam means.

6. In a strip ticket checking machine, means to feed the strip through the machine comprising feed rolls, an electric motor to drive the feed rolls, an electric switch, said switch closing the motor circuit when a strip is passing through the feed rolls, means to print a number on the face of the ticket and to simultaneously perforate said ticket, cam means to operate the mentioned printing and perforating means, means to sever the strip into individual tickets, cam means to operate the ticket severing means, means to render operative all of the cam means, means to stack the severed tickets, a coupon filled magazine and cam means to eject one coupon for each ticket so stacked.

7. In a strip ticket checking machine means to feed the strip through the machine, a strip operated switch controlling said feed means, ticket printing, perforating and severing means, cam means to operate said printing perforating and severing means, and strip controlled switch means to render operative said cam means.

8. In a strip ticket checking machine means to feed the strip through the machine, a strip operated switch controlling said feed means, ticket printing, perforating and severing means, cam means to operate said printing perforating and severing means, strip controlled switch means to render operative said cam means, ticket stacking means, a coupon filled magazine and cam means to eject one coupon for each ticket so stacked.

GEORGE D. ROEDELS.